(12) United States Patent
Suzuki et al.

(10) Patent No.: US 11,845,462 B2
(45) Date of Patent: Dec. 19, 2023

(54) DRIVING ASSISTANCE DEVICE AND DRIVING ASSISTANCE PROGRAM PRODUCT

(71) Applicant: DENSO CORPORATION, Kariya (JP)

(72) Inventors: Takamitsu Suzuki, Kariya (JP); Hiroshi Imajo, Kariya (JP); Masayuki Kondo, Kariya (JP); Tetsuro Koga, Kariya (JP); Erika Sawada, Kariya (JP)

(73) Assignee: DENSO CORPORATION, Kariya (JP)

(*) Notice: Subject to any disclaimer, the term of this patent is extended or adjusted under 35 U.S.C. 154(b) by 113 days.

(21) Appl. No.: 17/497,996

(22) Filed: Oct. 11, 2021

(65) Prior Publication Data

US 2022/0024478 A1 Jan. 27, 2022

Related U.S. Application Data

(63) Continuation of application No. 16/089,242, filed as application No. PCT/JP2017/009958 on Mar. 13, 2017, now Pat. No. 11,173,925.

(30) Foreign Application Priority Data

Apr. 1, 2016 (JP) .................. 2016-074381

(51) Int. Cl.
  *B60W 50/14* (2020.01)
  *B60W 30/08* (2012.01)
  *B60W 40/09* (2012.01)

(52) U.S. Cl.
  CPC ............ *B60W 50/14* (2013.01); *B60W 30/08* (2013.01); *B60W 40/09* (2013.01); *B60W 2050/146* (2013.01)

(58) Field of Classification Search
  CPC ...... B60W 50/14; B60W 30/08; B60W 40/09; B60W 2050/146

(Continued)

(56) References Cited

U.S. PATENT DOCUMENTS 5,949,331 A * 9/1999 Schofield ................. H04N 7/18
                                                  348/E7.086
7,904,247 B2  3/2011 Nakamori
                   (Continued)

FOREIGN PATENT DOCUMENTS

JP            09002098       *  1/1997
JP         2005134971 A        5/2005
                   (Continued)

OTHER PUBLICATIONS

Stéphanie Lefèvre, A survey on motion prediction and risk assessment for intelligent vehicles, 2014, ROBOMECH Journal (Year: 2014).*

(Continued)

*Primary Examiner* — Elaine Gort
*Assistant Examiner* — Matthias S Weisfeld
(74) *Attorney, Agent, or Firm* — Harness, Dickey & Pierce, P.L.C.

(57) ABSTRACT

A driving assistance device includes: a risk degree obtaining portion obtaining a degree of a risk of an event threatening a safety of a driver when an occurrence of the event is predicted; a risk handling control portion controlling an execution of a risk handling measure by a risk handling unit against the event that is predicted; a risk factor obtaining portion obtaining a factor which causes the risk as a risk factor; and a presentation control portion controlling a presentation of information about the risk factor. The presentation control portion presents information indicating a presence of the risk factor when the risk handling control portion controls the risk handling unit not to execute the risk handling measure and the degree of the risk is equal to or higher than a predetermined value.

4 Claims, 10 Drawing Sheets

(58) Field of Classification Search
USPC .............................................. 701/1
See application file for complete search history.

(56) References Cited

U.S. PATENT DOCUMENTS

| | | | | |
|---|---|---|---|---|
| 8,676,431 | B1* | 3/2014 | Mariet | G08G 1/0962 |
| | | | | 701/28 |
| 9,499,156 | B2 | 11/2016 | Sakima et al. | |
| 9,922,554 | B2* | 3/2018 | Mikuni | G08G 1/0137 |
| 2007/0053551 | A1 | 3/2007 | Kubo et al. | |
| 2014/0225721 | A1 | 8/2014 | Simon | |
| 2015/0015712 | A1* | 1/2015 | Sempuku | G08G 1/166 |
| | | | | 348/148 |
| 2015/0360565 | A1 | 12/2015 | Goto et al. | |
| 2016/0129836 | A1 | 5/2016 | Sugita et al. | |
| 2017/0132481 | A1* | 5/2017 | Sato | G06T 11/60 |

FOREIGN PATENT DOCUMENTS

| | | | |
|---|---|---|---|
| JP | 2006085285 | A | 3/2006 |
| JP | 2010067235 | A | 3/2010 |
| JP | 2015106326 | A | 6/2015 |
| JP | 2015232859 | A | 12/2015 |
| JP | 2017187848 | A | 10/2017 |

OTHER PUBLICATIONS

Yamamoto, et al., "Backpropagation Learning for Weighted Abduction", Journal of Information Processing Society of Japan, vol. 2012-NL-206 No. 9_vol.2012-SLP-91 No. 9, May 11, 2012, p. 1-8.
Hobbs, et al., "Interpretation as abduction", Artificial Intelligence, vol. 63, Nos. 1-2, (1993)69-412 Elsevier, p. 69-142.

* cited by examiner

FIG. 3A

| OBJECT RECOGNITION RESULT | LOGICAL CONSTANT |
|---|---|
| WALL | W |
| BALL 1 | B |

FIG. 3B

WEATHER AND ROAD CONDITIONS

| OBSERVATION EXAMPLE | OUTPUT LOGICAL FORMULA (LITERAL) |
|---|---|
| RAINING | Rainy(Scene) |
| NIGHT-TIME | dark(Scene) |
| ROAD WITH AN INTERSECTION | cross-road(C) |

ATTRIBUTES OF OBJECT

| OBSERVATION EXAMPLE | OUTPUT LOGICAL FORMULA (LITERAL) |
|---|---|
| X IS CAR | car(X) |
| Y IS PERSON | person(Y) |
| Y IS WITH OPEN UMBRELLA | with-umbrella(Y) |

POSITIONAL RELATIONSHIPS BETWEEN OBJECTS

| OBSERVATION EXAMPLE | OUTPUT LOGICAL FORMULA (LITERAL) |
|---|---|
| Y IS AHEAD OF X | in-front-of(Now,Y,X) |
| Y IS ON INTERSECTION C | on(Now,Y,C) |
| Y IS CLOSER TO INTERSECTION C THAN X | is-closer-to(Now,C,Y,X) |

FIG. 4

EXAMPLES HOW TO ASSIGN COST (SET INVERSELY PROPORTIONAL TO RELIABILITY)

| OBSERVATION EXAMPLE | RELIABILITY OF RECOGNITION | OUTPUT LOGICAL FORMULA |
|---|---|---|
| X IS CAR | 100% | $car(X)^{\$1}$ |
| Y IS PERSON | 50% | $person(Y)^{\$2}$ |
| Y IS WITH OPEN UMBRELLA | 25% | $with\text{-}umbrella(Y)^{\$4}$ |

FIG. 5

INTENTION ESTIMATION KNOWLEDGE BASE

| TYPES OF KNOWLEDGE | EXAMPLES | LOGICAL FORMULA |
|---|---|---|
| RELATIONSHIP BETWEEN INTENTION AND INTENTION | WHEN DRIVER HAS INTENTION TO TURN LEFT (RIGHT), DRIVER ALSO HAS INTENTION TO SLOW DOWN | $\forall x$ will-turn-left$(x)$ $^{1.2}$ $\rightarrow$ will-slow-down$(x)$ |
| RELATIONSHIP BETWEEN INTENTION AND STATE | WHEN LEFT TAIL LIGHT IS ON, DRIVER HAS INTENTION TO TURN LEFT | $\forall x$ will-turn-left$(x)$ $^{1.2}$ $\rightarrow$ left-tail-light-on$(x)$ |
| RELATIONSHIP BETWEEN INTENTION AND ROAD ENVIRONMENT | • WHEN PUDDLE FORMS IN FRONT, DRIVER HAS INTENTION TO TAKE AVOIDING ACTION<br>• BLIND SPOT IS OFTEN CREATED AT NIGHT | $\forall x, p$ in-front-of(Now,p,x) $^{0.6}$ $\wedge$ puddle(p) $^{0.6}$ $\rightarrow$ will-avoid$(x)$ |
| RELATIONSHIP BETWEEN INTENTION AND POSITIONAL RELATIONSHIP | • WHEN LOCATION OF AGENT OVERLAPS WITH DRIVER'S LOCATION IN FUTURE, EITHER ONE TAKE AVOIDING ACTION<br>• WHEN AGENT HAS INTENTION TO TURN RIGHT, AGENT'S VEHICLE IS AHEAD OF OWN VEHICLE ON RIGHT IN FUTURE | $\forall x,y,l$ on(Future,x,l) $^{0.6}$ $\wedge$ on(Future,y,l) $^{0.6}$ $\rightarrow$ will-avoid$(x)$<br><br>$\forall x,y,l$ will-turn-right$(x)$ $^{0.6}$ $\wedge$ right-front-of(Now,l,x) $^{0.6}$ $\rightarrow$ on(Future,l,x) |
| RELATIONSHIP BETWEEN INTENTION AND (POSITIONAL RELATIONSHIP + OBJECT TYPE) | WHEN HEAVY VEHICLE IS RUNNING AHEAD, DRIVER TAKE AVOIDING ACTION | $\forall t, x$ in-front-of(Now,p,x) $^{0.6}$ $\wedge$ heavy(t) $^{0.6}$ $\rightarrow$ will-avoid$(x)$ |

FIG. 6

NATURAL LAW KNOWLEDGE BASE

| | | |
|---|---|---|
| GUARANTEE OF CONSISTENCY (CONCEPT) | NATURE OF ADULT AND NATURE OF CHILD ARE NOT ESTABLISHED AT THE SAME TIME | $\forall x \; adult(x) \land child(x) \rightarrow \bot$ |
| GUARANTEE OF CONSISTENCY (LOCATION) | • CAR CANNOT BELONG TO DIFFERENT LANES AT THE SAME TIME<br>• WHEN X EXISTS ON LEFT OF Y, X CANNOT EXIST ON RIGHT OF Y | $\forall x \; on(x, MyLane) \land on(x, OppositeLane) \rightarrow \bot$<br>$\forall x,y \; left\text{-}of(x,y) \land right\text{-}of(x,y) \rightarrow \bot$ |
| HIGH-LOW ORDER RELATION BETWEEN CONCEPTS | TRUCK IS VEHICLE | $\forall x \; car(x)^{1.2} \rightarrow vehicle(x)$ |
| PHYSICAL LAW | AGENT MOVES FORWARD | $\forall x,l \; agent(x)^{0.6} \land in\text{-}front\text{-}of(Now,l,x)^{0.6} \rightarrow on(Future,x,l)$ |
| POSITIONAL RELATIONSHIP AND VISIBILITY | SHIELDING OBJECT IS PRESENT BETWEEN TWO AGENTS INVISIBLE TO EACH OTHER | $\forall x,y \; invisible\text{-}to(Now,x,y)^{1.2} \rightarrow \exists z \; in\text{-}between(Now,z,x,y)$ |
| OBJECT-TO-OBJECT RELATIONSHIP | CHILD<br>(FOLLOWS SOCCER BALL<br>PLAYS IN PARK<br>RUNS UP TO MOTHER)<br>• TAXI STOPS IN FRONT OF PERSON | $\forall x,y \; child(x)^{0.6} \land follows(x,y)^{0.6} \rightarrow soccer\text{-}ball(y)$<br>$\forall x,y \; taxi(x)^{0.4} \land person(y)^{0.4} \land left\text{-}front\text{-}of(Now,x,y)^{0.4}$<br>$\rightarrow will\text{-}stop(x)$ |

FIG. 7

RISK FACTOR KNOWLEDGE BASE

| | | |
|---|---|---|
| COLLISION | IN CASE THAT OBJECT EXISTS AT YOUR LOCATION IN FUTURE, THE OBJECT POSES RISK | $\forall x,y,l \text{ on}(\text{Future},x,l)^{0.6} \land \text{on}(\text{Future},y,l)^{0.6}$ $\rightarrow \text{risk}(r,x)$ |
| INTENTION | IN CASE WHERE OBJECT THAT INTENDS TO (SLOW DOWN \| TURN LEFT) IS RUNNING AHEAD OF YOU, THE OBJECT POSES RISK | $\forall x,y,l \text{ in-front-of}(\text{Now},x,y)^{0.6} \land \text{will-stop}(y)^{0.6}$ $\rightarrow \text{risk}(r,x)$ |
| INVISIBLE OBJECT | IN CASE OBJECT INVISIBLE TO YOU RUSHES OUT, THE OBJECT POSES RISK | $\forall x,y,l \text{ invisible-to}(\text{Now},x,y)^{0.6} \land \text{will-rush-out}(y)^{0.6}$ $\rightarrow \text{risk}(r,x)$ |

DRIVING ASSISTANCE DEVICE AND DRIVING ASSISTANCE PROGRAM PRODUCT

CROSS REFERENCE TO RELATED APPLICATIONS

This application is a continuation Application of U.S. patent application Ser. No. 16/089,242 filed Sep. 27, 2018 which is a U.S. National Phase Application under 35 U.S.C. 371 of International Application No. PCT/JP2017/009958 filed on Mar. 13, 2017. These applications are based on and claim the benefit of priority from Japanese Patent Application No. 2016-074381 filed on Apr. 1, 2016. The entire disclosures of all of the above applications are incorporated herein by reference.

TECHNICAL FIELD

The present disclosure relates to a driving assistance device and to a driving assistance program product.

BACKGROUND ART

It is important for safety that a driver's line of sight is directed to a road in a vehicle moving direction while driving. A driving assistance configuration proposed in the related art presents warning information indicating an occurrence of an event threatening safety of a driver (for example, appearance of a bicycle running parallel to an own vehicle) upon occurrence of such an event (see, for example, Patent Literature 1).

PRIOR ART LITERATURE

Patent Literature

Patent Literature 1: JP 2015-106326 A

SUMMARY OF INVENTION

An occurrence of an event threatening safety of the driver is a precondition for the configuration of the above-described related art and warning information is presented after the event becomes apparent. The configuration above is effective in giving warning to the driver. However, the driver is unable to take any measure unless the event threatening safety of the driver becomes apparent. A well-experienced driver knows tips on where to look to drive safely and has a habit of safe driving whereas an inexperienced driver is less likely to know such tips and have a habit of safe driving.

In view of the foregoing difficulties, it is an object of the present disclosure to provide a driving assistance device and a driving assistance program product capable of properly assisting a driver with driving operation by giving a driver tips on where to look to drive safely.

According to an aspect of the present disclosure, a risk degree obtaining portion obtaining a degree of a risk of an event threatening a safety of a driver when an occurrence of the event is predicted; a risk handling control portion controlling an execution of a risk handling measure by a risk handling unit against the event that is predicted; a risk factor obtaining portion obtaining a factor which causes the risk as a risk factor; and a presentation control portion controlling a presentation of information about the risk factor. The presentation control portion presents information indicating a presence of the risk factor when the risk handling control portion controls the risk handling unit not to execute the risk handling measure and the degree of the risk is equal to or higher than a predetermined value.

Information indicating presence of a risk factor is presented when a degree of risk becomes equal to or above the predetermined value even when the risk handling unit does not take a risk handling measure since an event threatening safety of the driver is not apparent. By presenting information indicating presence of a risk factor before an event threatening safety of the driver becomes apparent, the driving assistance device can control a driver's line of sight to direct to a direction in which the risk factor is present. The configuration as above is thus capable of appropriately assisting a driver with driving operation by giving the driver tips on where to look to drive safely.

BRIEF DESCRIPTION OF DRAWINGS

The above and other objects, features and advantages of the present invention will become more apparent from the following detailed description made with reference to the accompanying drawings. In the drawings:

FIG. 3A shows a table indicating a relationship between an object recognition result and a logical constant;

FIG. 3B shows tables indicating conversion rules applied when converting observation information into a logical formula;

FIG. 4 shows a table indicating how costs are assigned to observation literals;

FIG. 5 shows a table indicating an intention estimation knowledge base;

FIG. 6 shows a table indicating a natural law knowledge base;

FIG. 7 shows a table indicating a risk factor knowledge base;

EMBODIMENTS FOR CARRYING OUT INVENTION

Figure 1:
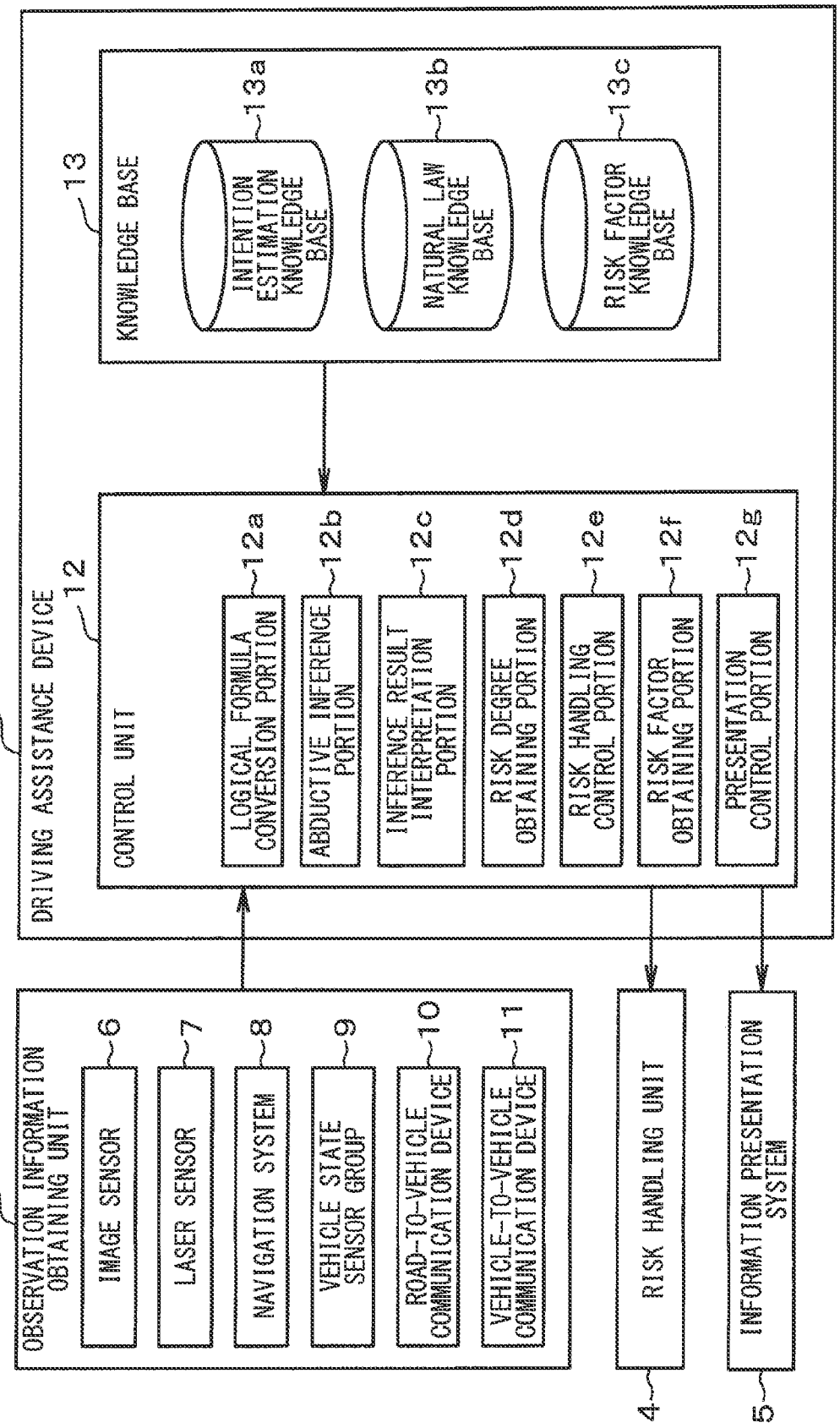
FIG. 1 is a functional block diagram of one embodiment.

Hereinafter, one embodiment will be described with reference to the drawings. A driving assistance system 1 includes a driving assistance device 2, an observation information obtaining unit 3, a risk handling unit 4, and an information presentation system 5.

The observation information obtaining unit 3 includes an image sensor 6, a laser sensor 7, a navigation system 8, a vehicle state sensor group 9, a road-to-vehicle communication device 10, and a vehicle-to-vehicle communication device 11. The image sensor 6 and the laser sensor 7 obtain information on various objects present on a periphery of a vehicle. The navigation system 8 detects a present location of the vehicle and obtains various types of information from a map near the present location. The vehicle state sensor group 9 obtains information on a behavior of the vehicle and a state of the vehicle. The road-to-vehicle communication device 10 obtains information on traffic jamming, road regulations, and so on from a communication party which is provided by an infrastructure. The vehicle-to-vehicle communication device 11 obtains information on a behavior of another vehicle present on the periphery of the vehicle. The observation information obtaining unit 3 observes a situation of the vehicle and surrounding circumstances of the vehicle from the information specified above, generates an observation information group D1 for an object present on the periphery of the vehicle, and outputs the observation information group D1 thus generated to the driving assistance device 2. The observation information group D1 generated in the observation information obtaining unit 3 contains information on at least a type of object, an attribute of object, and information reliability. For example, in a case where an object is a mobile object, an attribute of object includes a location, a moving velocity, and a moving direction of the object, and so on. In a case where an object is a pedestrian, an attribute of object may include a gender, an adult or a child, belongings, and so on.

Upon input of a risk handling signal from the driving assistance device 2, the risk handling unit 4 takes a risk handling measure, such as controls the vehicle and notifies the driver of a risk. The risk handling unit 4 controls the vehicle by taking a risk handling measure, for example, a speed control, a speed reduction, an emergency stop, and automated driving to avoid a risk. The risk handling unit 4 notifies the driver of a risk by taking a risk handling measure, such as an auditory notification or a visual notification. The risk handling unit 4 provides an auditory notification by, for example, outputting a warning sound from a buzzer, outputting a warning speech as an audio guidance from a speaker. The risk handling unit 4 provides a visual notification by, for example, displaying a danger spot on a map screen, displaying a danger spot and attracting the driver's line of sight to the danger spot using a head-up display. The risk handling unit 4 may change contents of a risk handling measure depending on a degree of risk.

The information presentation system 5 is a display unit formed of, for example, a liquid crystal display and provided to a position easy to see from the driver even while driving, such as close to a speedometer. Upon input of a presentation command signal from the driving assistance device 2, the information presentation system 5 presents (displays) a risk factor which may develop to a risk. A risk factor may be a bicycle running parallel to an own vehicle, a pedestrian walking along a roadside, another vehicle coming closer to the own vehicle in an attempt to overtake. The risk factor is an event threatening safety of the driver.

The driving assistance device 2 includes a control unit 12 and a knowledge base 13. The control unit 12 is formed of a micro-computer having a CPU (Central Processing Unit), a ROM (Read Only Memory), a RAM (Random Access Memory), and an I-O (Input-Output). By running a computer program stored in a non-transitory tangible recording medium, the control unit 12 performs a process according to the computer program and controls an overall operation of the driving assistance device 2. The computer program executed by the control unit 12 includes a driving assistance program.

The control unit 12 includes a logical formula conversion portion 12a, an abductive inference portion 12b, an inference result interpretation portion 12c, a risk degree obtaining portion 12d, a risk handling control portion 12e, a risk factor obtaining portion 12f, and a presentation control portion 12g. The respective portions 12a through 12g are formed of the computer program executed by the control unit 12 and implemented in software manner.

The logical formula conversion portion 12a converts the observation information group D1 generated in the observation information obtaining unit 3 into a logical formula. Hereinafter, a literal forming a logical formula is expressed as Li, where i is an identifier and has a value of positive integer. A literal means a logical formula without a partial logical formula. A cost is given to each literal. A cost is a value set according to reliability of a literal and hence reliability of observation, which is a literal generation source, and expressed as ci. Herein, a cost ci is set to a value ranging from 1 to 100 in inverse proportion to reliability. That is, a cost ci=1 means that a content expressed by a literal Li definitely holds true and means 100% reliability. Conversely, a cost ci=100 means that whether a content expressed by a literal Li holds true is totally unknown and means 0% reliability. Hereinafter, a literal with a cost is expressed as Li$ci.

Figure 2:
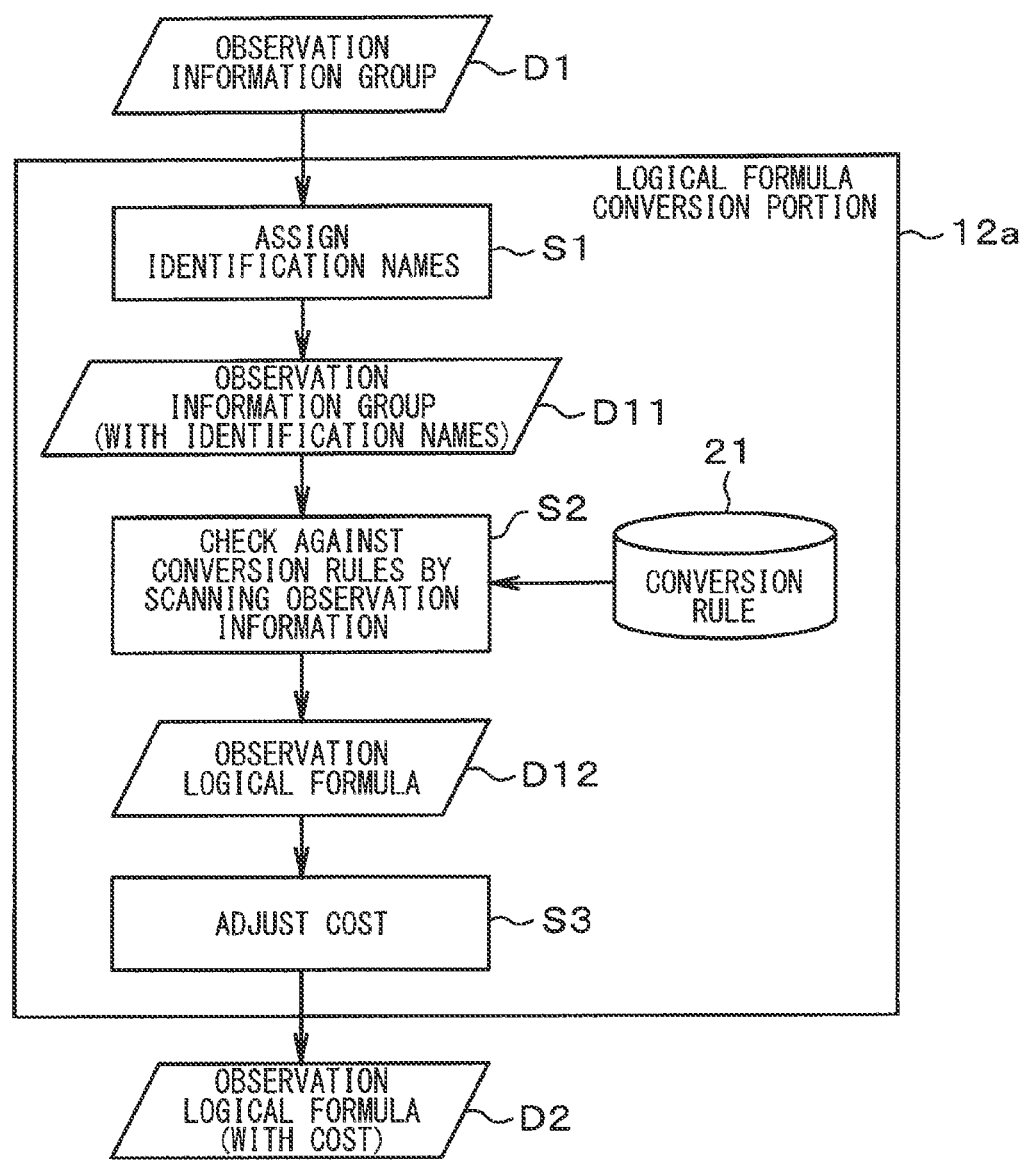
FIG. 2 is a diagram showing a flowchart of a process performed by a logical formula conversion portion.

A process performed by the logical formula conversion portion 12a will now be described with reference to FIG. 2.

The logical formula conversion portion 12a assigns identification names for identifying objects to respective pieces of the observation information forming the observation information group D1 and generates an observation information group D11 with the identification names (S1). As is set forth in FIG. 3A, logical constants represented by symbols, such as alphabets, are used as the identification names for identifying the objects.

The logical formula conversion portion 12a scans the observation information forming the observation information group D11 with identification names, checks the observation information against a conversion rule 21, and converts the observation information into literals Li. Then, the logical formula conversion portion 12a sets a cost of each literal Li to a unique value of ci=1. The logical formula conversion portion 12a generates an observation logical formula D12, which is a logical formula formulated by combining the literals with costs by using a logical operator AND ($\wedge$) (S2).

As is set forth in FIG. 3B, examples of the conversion rule 21 include but not limited to a rule relating to weather and road conditions (it is raining/it is night-time/a road has an intersection), a rule relating to the attribute of object (an object X is a car/an object Y is a pedestrian/an object Y is with an open umbrella), a rule relating to a positional relationship between objects (Y is ahead of X/Y is on an intersection C/Y is closer to an intersection C than X).

As is set forth in FIG. 4, the logical formula conversion portion 12a adjusts the cost ci for each literal with cost Li$ci, which forms the observation logical formula D12, according to reliability of recognition of the observation information, which is the literal generation source, and outputs an adjustment result as an observation logical formula D2 with cost (S3).

The knowledge base 13 is general knowledge expressed by knowledge logical formulae and includes an intention estimation knowledge base 13a, a natural law knowledge base 13b, and a risk factor knowledge base 13c. Define Aj and C as literals, and define wj as a real-valued weight of a literal Aj and wj is set to 0 or greater. Then contents of the respective knowledge bases 13a through 13c are expressed by a knowledge logical formula (1) as follows:

$$A1^{w1} \wedge A2^{w2} \wedge - \wedge An^{wn} \rightarrow C \qquad (1)$$

The intention estimation knowledge base 13a is a description about relationships among a driver's intention, a vehicle state and road environment, a positional relationship with respect to a detected object, and so on. The intention estimation knowledge base 13a is written in a predicate logic. As is set forth in FIG. 5, contents, for example, "when a driver has an intention to turn left (right), the driver also has an intention to slow down", "when a left tail light is ON, a driver has an intention to turn left", and "when a heavy vehicle is running ahead, a driver may take an avoiding action" are expressed by knowledge logical formulae.

The natural law knowledge base 13b is a description about inconsistent relationships in physical law and concept, relationships between objects, and so on. As is set forth in FIG. 6, contents, for example, "a nature of being an adult and a nature of being a child are not established at the same time", "a car cannot belong to different lanes at the same time", and "a child follows a soccer ball" are expressed by knowledge logical formulae.

The risk factor knowledge base 13c is a description about patterns of dangerous surrounding circumstances and expressed by knowledge logical formulae with a consequent of "risk". As is set forth in FIG. 7, contents, for example, "in case an object exists at your location in future, the object poses a risk", "in a case where an object having an intention to slow down and turn left is running ahead of you, the object poses a risk", "in case an object invisible to you rushes out, the object poses a risk" are expressed by knowledge logical formulae.

Knowledge logical formulae stored in the knowledge base 13 may be formulated manually or automatically obtained from web pages, a database of a collection of accidents, or the like by using a known text mining technique. A weight wj may be added to a literal Aj manually or automatically by using a known supervised machine learning method (for example, Fuuto Yamamoto, Naoya Inoue, Yotaro Watanabe, Naomi Okazaki, and Kentaro Inui, "Backpropagation Learning for Weighted Abduction", Journal of Information Processing Society of Japan, Vol. 2012-NL-206, May 2012).

The following lists examples of literals converted from the observation information group D1 and literals used to describe contents (logical formulae) in the knowledge base 13. Literals include literals expressing types of object, literals expressing states of object, literals expressing intentions of agents, literals expressing positional relationships between objects, literals expressing semantic relationships between objects, literals expressing road conditions, and so on.

Examples of literals expressing types of object include but not limited to: adult, agent, dangerous-agent, dog, elder, child, children, person, group-of-children, group-of-persons, ambulance, bicycle, bus, car, group-of-cars, motor-bicycle, motor-cycle, tank-truck, taxi, van, vehicle, alley, apartment, break, building, bridge, cone, gate, park, wall, cross-road, cross-walk, curve, descent, lane, intersection, railroad-crossing, signal, singal4walker, safety-zone, dangerous-spot, biscuit, soccer-ball, thing, iron-plate, leaf, light, load, obstacle, screen, puddle, and sandy-spot.

Examples of literals expressing states of object include but not limited to: left-head-lamp-on, left-tail-light-on, right-head-lamp-on, right-tail-light-on, being-parked, empty, signal-blue, signal-blue-blink, signal-yellow, nothing-on, parked, invisible-to, visible-to, waving-hands, and wheel-drop.

Examples of literals expressing intentions of agents include but not limited to: will-across, will-avoid, will-be-out-of-lane, will-change-direction, will-change-lane, will-cross, will-give-way, will-go-back, will-go-front, will-go-left, will-go-right, will-move-front-side, will-open-door, will-open-left-door, will-overtake, will-rush-out, will-slow-down, will-speed-up, will-splash, will-stay, and will-stop.

Examples of literals expressing positional relationships between objects include but not limited to: around, behind, left-behind, left-front-of, left-of, not-in-front-of, not-left-front-of, not-left-of, right-behind, right-front-of, right-of, side-front-of, front-side-of, in-between, in-front-of, is-closer-to, is-closest-vehicle-to, on, catch, and contact.

Examples of literals expressing semantic relationships between objects include but not limited to: belongs-to, has, keep, mother-of, plays-at, follows, ride-on, and heavier-than.

Examples of literals expressing road conditions include but not limited to: environment, facility, construction-site, rainy, wet, icy, muddy, dark, snowy, and straight.

The abductive inference portion 12b performs an abductive inference about dangerous circumstances by using the observation logical formula D2 converted in the logical formula conversion portion 12a and a knowledge logical formula D3 stored in the knowledge base 13. The abductive inference portion 12b proves a risk predicted from the observation logical formula D2 by using the knowledge logical formula D3 as background knowledge. Herein, a proof of maximum-likelihood is found by using weighted abductive inference (see Hobbs, Jerry R., Mark Stickel, Douglas Appelt, and Paul Martin, 1993. "Interpretation as Abduction", Artificial Intelligence, Vol. 63, Nos. 1-2, pp. 69-142).

Figure 8:
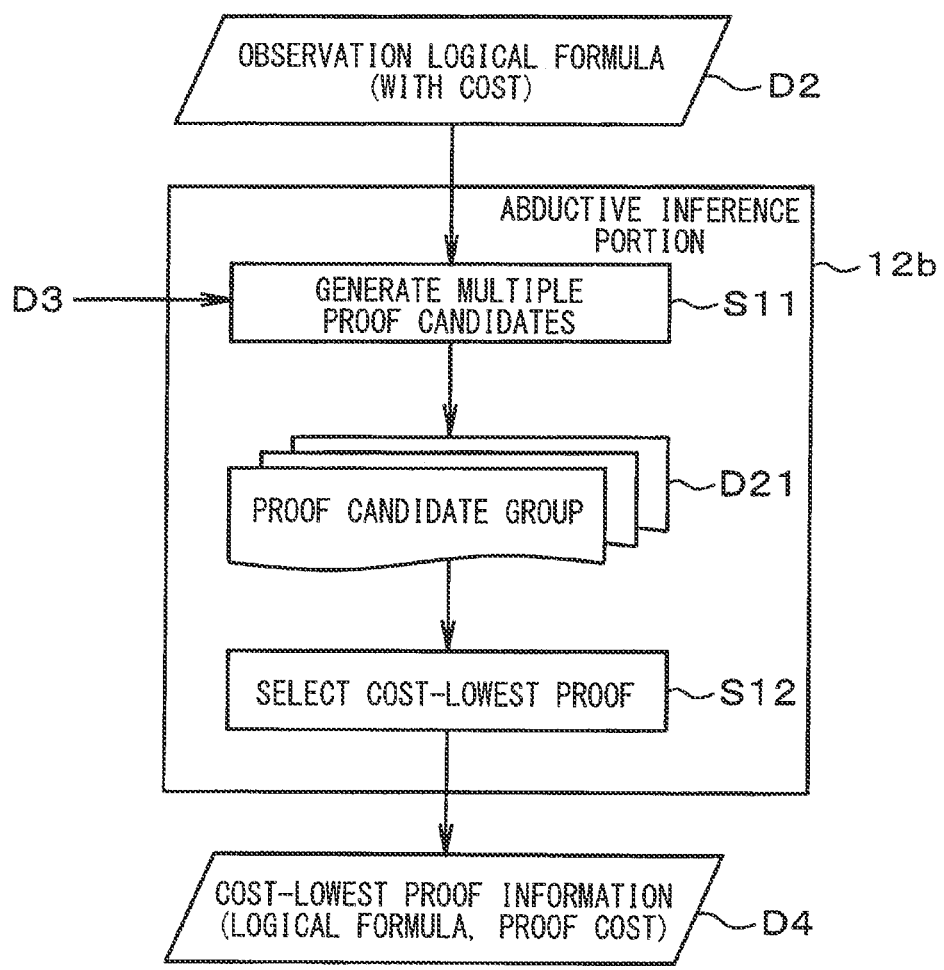
FIG. 8 shows a flowchart of a process performed by an abductive inference portion.

A process performed by the abductive inference portion 12b will now be described with reference to FIG. 8.

The abductive inference portion 12b generates a proof candidate, which is a logical formula formulated by combining the observation logical formula D2 and a literal expressing "risk" with a logical operator "AND ($\wedge$)" and generates multiple proof candidates by applying backward inference to the generated proof candidate (S11).

More specifically, the abductive inference portion 12b generates multiple proof candidates by applying rules of the risk factor knowledge base 13c to a literal expressing "risk" in the proof candidate generated first. The phrase, "apply rules", referred to herein means a procedure as follows. That is, define a literal forming the proof candidate as a target literal, then the knowledge logical formula D3 with the target literal as a consequent of the rule are extracted and the target literal in the proof candidate is replaced by an antecedent of the extracted knowledge logical formula D3. The abductive inference portion 12b generates a series of multiple proof candidates by repeatedly performing the procedure to apply rules of the intention estimation knowledge base 13a and the natural law knowledge base 13b to an arbitrary literal in each of the multiple proof candidates generated in the manner as above. Hereinafter, a set of proof candidates thus generated is referred to as a proof candidate group D21.

The abductive inference portion 12b calculates a proof cost for each proof candidate belonging to the proof candidate group D21 to select a cost-lowest proof, which is a proof candidate with a most low proof cost (extract a proof of maximum-likelihood), and outputs a logical formula and a proof cost of the cost-lowest proof as cost-lowest proof information D4 (S12).

The abductive inference portion 12b calculates a proof cost by adding up costs of all literals forming the proof candidate. In a case where "rules are applied", the abductive inference portion 12b multiplies a cost $c_i$ of a literal before replacement (literal subject to replacement) by a weight $w_j$ given to a literal after replacement (replaced literal) and uses a resulting product as a cost of the replaced literal. For example, when two literals of a same predicate are in the proof candidate, the abductive inference portion 12b unifies the two literals by deleting whichever has the higher cost. That is, a proof cost normally increases by applying rules because the number of literals forming the proof candidate increases. However, when same literals are in one proof candidate, the proof cost is reduced in some case. The above indicates that of all the rules of the risk factor knowledge base 13c, one rule that can be proved intuitively by using more observation logical formulae is the proof of maximum likelihood.

Given that a set B of the knowledge logical formulae D3, which are rules used for proof, and a set O of literals forming the observation logical formula are expressed, respectively, by formula (2) and formula (3) below, where p(x), q(x), r(x), and s(x) are literals.

$$B=\{p(x)^{1.2} \to q(x) \cdot (x)^{0.8} \wedge r(x)^{0.4} \to s(x)\} \quad (2)$$

$$O=\{q(a)^{\$10}, s(b)^{\$10}\} \quad (3)$$

As is expressed in the formula (4) below, an observation logical formula itself is given as a proof candidate H1. Then, a proof cost of the proof candidate H1, cost (H1), is found in accordance with formula (5) below.

$$H1=\{q(a)^{\$10}, s(b)^{\$10}\} \quad (4)$$

$$\text{cost}(H1)=10+10=20 \quad (5)$$

By applying a rule to a literal q(a) belonging to the proof candidate H1, a proof candidate H2 expressed by formula (6) below is generated. Deleting the literal subject to replacement from the proof candidate H2 is expressed by setting a cost of the literal to $0. A proof cost of the proof candidate H2, cost (H2), is found in accordance with formula (7) below. It is understood that the proof cost of the proof candidate H2 increases from the proof cost of the proof candidate H1 by applying the rule, that is, by performing backward inference.

$$H2=\{q(a)^{\$0}, s(b)^{\$10}, p(a)^{\$1.2 \cdot 10=\$12}\} \quad (6)$$

$$\text{cost}(H2)=10+12=22 \quad (7)$$

By applying the rule to a literal s(b) belonging to the proof candidate H2, a proof candidate H3 expressed by formula (8) below is generated. A simply found proof cost of the proof candidate H3, cost (H3), is expressed by formula (9) below.

$$H3=\{q(a)^{\$0}, s(b)^{\$0}, p(a)^{\$12}, p(b)^{\$8}, r(b)^{\$4}\} \quad (8)$$

$$\text{cost}(H3)=12+8+4=24 \quad (9)$$

However, same literals p(a) and p(b) are in the proof candidate H3. Hence, the two literals are unified (a=b) and the literal p(a) with the higher cost is deleted. Consequently, the proof candidate H3 is expressed by formula (10) below. That is, it is understood that the proof cost of the proof candidate H3, cost(H3), is actually found in accordance with formula (11) below and that the proof cost is reduced by unifying the literals.

$$H3=\{q(a)^{\$0}, s(b)^{\$0}, p(b)^{\$8}, r(b)^{\$4}, a=b\} \quad (10),$$

$$\text{cost}(H3)=8+4=12 \quad (11)$$

The inference result interpretation portion 12c identifies a risk predicted from present surrounding circumstances by using the cost-lowest proof information D4 and by referring to the observation logical formula D2 and the observation information correlated with the respective literals forming the observation logical formula D2. The inference result interpretation portion 12c calculates a degree of risk of the identified risk and identifies a danger spot. The inference result interpretation portion 12c is capable of identifying a risk from the rule of the risk factor knowledge base 13c used to generate the cost-lowest proof and capable of calculating a degree of risk from the proof cost. To be more exact, a reciprocal of the proof cost may be calculated as a degree of risk. Alternatively, a degree of risk may be calculated by using a regression model using a proof result, proof cost, an own vehicle speed, and so on as a feature amount. Also, a danger spot may be identified by correlating literals forming the cost-lowest proof with identification names assigned to literals forming the observation logical formula D2 and by using location information of an object specified by the observation information identified via a correlated identification name.

The risk degree obtaining portion 12d obtains a degree of risk calculated in the inference result interpretation portion 12c. The risk handling control portion 12e controls the risk handling unit 4 to take a risk handling measure, such as controlling the vehicle and notifying the driver of a risk, as described above by using a risk prediction result. The risk factor obtaining portion 12f obtains a risk factor which may cause a risk. The presentation control portion 12g controls presentation of information on a risk factor by controlling an output of a presentation command signal to the information presentation system 5.

Figure 9:
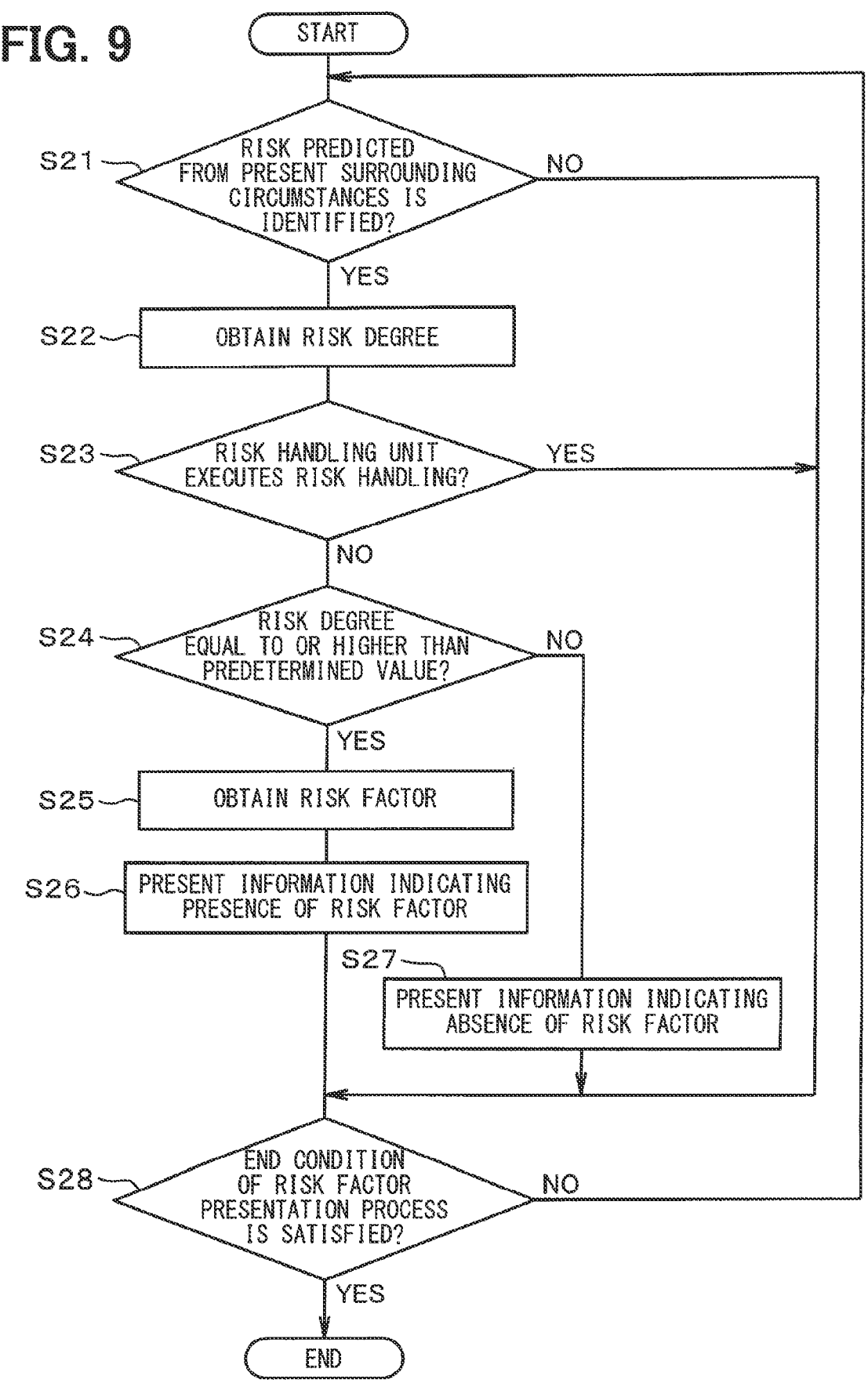
FIG. 9 shows a flowchart of a process performed by a control unit.

A function of the configuration above will now be described with reference to FIG. 9 through FIG. 11.

The control unit 12 performs risk factor presentation process. The control unit 12 starts the risk factor presentation process when a start condition of the risk factor presentation process is satisfied, for example, when an ignition switch is switched ON from OFF. The control unit 12 may determine that the start condition of the risk factor presentation process is also satisfied when, for example, a vehicle speed rises to and stays at or above a certain speed or the driver makes a predetermined operation in addition to ON-OFF switching of the ignition switch.

When the risk factor presentation process starts, the control unit 12 determines whether the inference result interpretation portion 12c identifies a risk predicted from present surrounding circumstances (S21). When it is determined that the inference result interpretation portion 12c identifies a risk predicted from present surrounding circumstances (S21: YES), the control unit 12 obtains a degree of risk by using the risk degree obtaining portion 12d (S22, corresponding to a risk degree obtaining step), and determines whether the risk handling unit 4 executes a risk handling measure (S23). When it is determined that the risk handling unit 4 executes a risk handling measure (S23: YES), the control unit 12 determines that an event threatening safety of the driver is now apparent and determines whether an end condition of the risk factor presentation process is satisfied (S28) by skipping Steps S24 through S27 described below.

Meanwhile, when it is determined that the risk handling unit 4 does not execute a risk handling measure (S23: NO), the control unit 12 determines that an event threatening safety of the driver is not apparent and determines whether a degree of risk is equal to or higher than a predetermined value (S24). The control unit 12 determines whether a degree of risk is equal to or higher than the predetermined value by using, for example, a distance between an object which configures an event threatening safety of the driver and the own vehicle or a moving direction of the object. For example, when it is determined that a distance between the object and the own vehicle is shorter than a predetermined distance or the object is moving in a direction to come closer to the own vehicle, the control unit 12 determines that a degree of risk is equal to or higher than the predetermined value. When it is determined that a risk of degree is equal to or higher than the predetermined value (S24: YES), the control unit 12 obtains a risk factor by using the risk factor obtaining portion 12f (S25, corresponding to a risk factor obtaining step), and controls the information presentation system 5 to present information indicating presence of a risk factor by outputting a presentation command signal to the information presentation system 5 (S26, corresponding to a presentation control step).

Meanwhile, when it is determined that, for example, a distance between the object and the own vehicle is equal to or longer than the predetermined distance or the object is moving in a direction to move away from the own vehicle, the control unit 12 determines that a degree of risk is lower than the predetermined value. When it is determined that a degree of risk is lower than the predetermined value (S24: NO), the control unit 12 does not obtain a risk factor by using the risk factor obtaining portion 12f and controls the information presentation system 5 to present information indicating absence of a risk factor by outputting a presentation command signal to the information presentation system 5 (S27, corresponding to the presentation control step).

The control unit 12 determines whether an end condition of the risk factor presentation process is satisfied (S28). When it is determined that the end condition of the risk factor presentation process is not satisfied (S28: NO), the flow returns to Step S21 to repeat Step S21 and the following steps. When it is determined that the end condition of the risk factor presentation process is satisfied (S28: YES), for example, when the ignition switch is switched OFF from ON, the control unit 12 ends the risk factor presentation process. The control unit 12 may determine that the end condition of the risk factor presentation process is also satisfied when a vehicle speed decreases and stays below a certain speed, or the driver makes a predetermined operation in addition to ON-OFF switching of the ignition switch.

Figure 10:
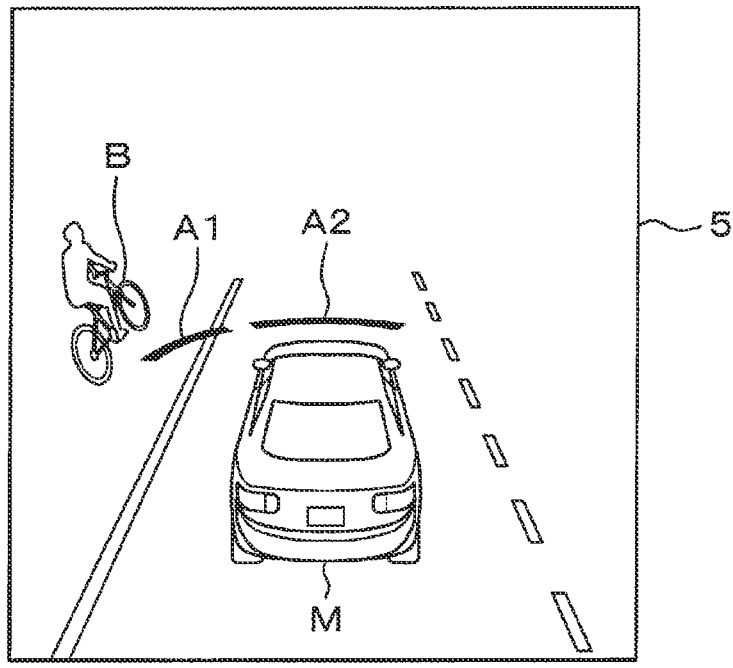
FIG. 10 is a diagram showing a display example when a risk factor is presented.
Figure 11:
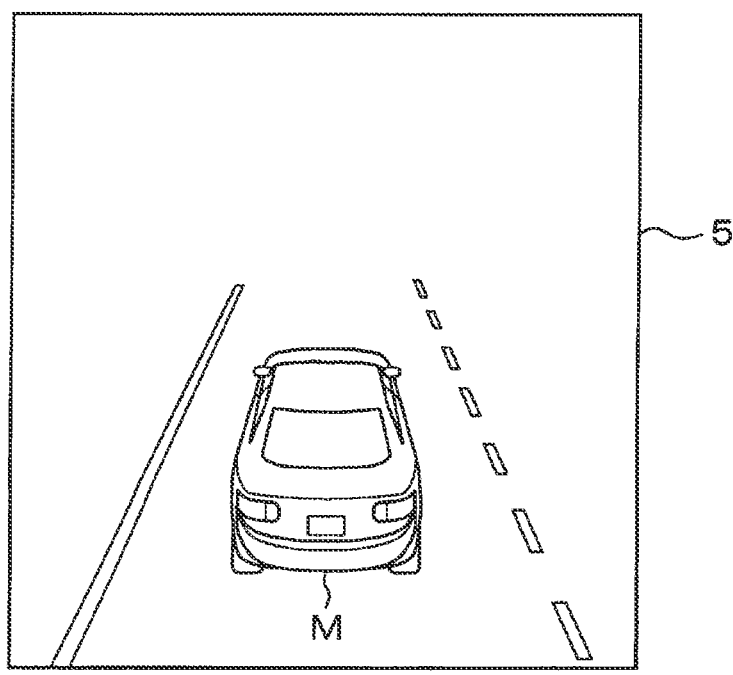
FIG. 11 is a diagram showing a display example when a risk factor is not presented.

When it is determined that the risk handling unit 4 does not execute a risk handling measure and a degree of risk is equal to or higher than the predetermined value, the control unit 12 determines that a possibility that an event threatening safety of the driver becomes apparent is relatively high, and presents information indicating presence of a risk factor as is shown in FIG. 10. In an example of FIG. 10, the control unit 12 presents an icon M representing the own vehicle, an icon B representing a bicycle as a risk factor, an icon A1 representing a direction in which the bicycle as the risk factor is present when viewed from the own vehicle, and an icon A2 representing a moving direction of the own vehicle. Accordingly, the driver is notified of that a bicycle as a risk factor appears ahead of the own vehicle on the left after a short time (for example, several seconds later) before the bicycle actually appears ahead of the own vehicle on the left. Consequently, the driver becomes able to regularly direct the line of sight to a left front of the vehicle and hence becomes able to drive the vehicle carefully while moving the line of sight to the left front of the vehicle.

When it is determined that the risk handling unit 4 does not execute a risk handling measure and a degree of risk is lower than the predetermined value, the control unit 12 determines that a possibility that an event threatening safety of the driver becomes apparent is relatively low. Hence, as is shown in FIG. 11, the control unit 12 presents information indicating absence of a risk factor. In an example of FIG. 11, the control unit 12 presents an icon M representing the own vehicle but does not present an icon representing a risk factor, an icon representing a direction in which the risk factor is present when viewed from the own vehicle, or an icon representing a moving direction of the own vehicle. Accordingly, the driver is notified of that a risk factor does not appear for a while (for example, for several seconds). Consequently, the driver's line of sight can be kept directed to a vehicle moving direction and therefore the driver becomes able to drive without moving the line of sight unnecessarily. While the above has described examples where a bicycle running parallel to the own vehicle is a risk factor, a risk factor may be a pedestrian walking along a roadside, another vehicle coming closer to the own vehicle in an attempt to overtake, and so on. In such a case, too, the control unit 12 presents information indicating presence of a risk factor in the same manner as above.

The following advantages can be obtained by the present embodiment described above.

The driving assistance device 2 presents information indicating presence of a risk factor while a degree of risk is equal to or higher than the predetermined value even though the risk handling unit 4 does not execute a risk handling measure, that is, when an event threatening safety of the driver is not apparent. By presenting information indicating presence of a risk factor before an event threatening safety of the driver becomes apparent, the driver's line of sight can be directed to a direction in which the risk factor is present. The driving assistance device 2 is thus capable of appropriately assisting a driver with driving operation by giving the driver tips on where to look to drive safely.

The driving assistance device 2 presents information indicating absence of a risk factor while a degree of risk is lower than the predetermined value. Consequently, by presenting information indicating absence of a risk factor, the driver's line of sight can be kept directed to a vehicle moving direction. Hence, an unwanted situation that the driver moves the line of sight unnecessarily can be avoided.

While the disclosure has been described with reference to a preferred embodiment thereof, it is to be understood that the disclosure is not limited to the preferred embodiment and constructions. The disclosure is intended to cover various modification and equivalent arrangements. In addition, the various combinations and configurations, which are preferred, other combinations and configurations, including more, less or only a single element, are also within the spirit and scope of the disclosure.

The above has described a configuration to present information indicating absence of a risk factor when it is determined that the risk handling unit 4 does not execute a risk handling measure and a degree of risk is lower than the predetermined value as an example. Alternatively, information indicating absence of a risk factor may not be presented when it is determined that the risk handling unit 4 does not execute a risk handling measure and a degree of risk is lower than the predetermined value.

A determination as to whether a degree of risk is equal to or higher than the predetermined value may be made continuously after the information indicating presence of a risk factor is presented. In such a case, presentation of the information being presented may be continued when a degree of risk maintains equal to or higher than the predetermined value and the information being presented may be erased when a degree of risk decreases to a value lower than the predetermined value.

In a case where multiple events with relatively high possibilities of becoming apparent occur at a same time, multiple icons representing the respective risk factors may be presented at the same time. For example, different icons may be presented at the same time at, for example, the right front of the vehicle and the left front of the vehicle. When configured in such a manner, the driver's line of sight can be directed regularly to the right front of the vehicle and the left front of the vehicle in turn. Hence, the driver becomes able to drive carefully by directing the line of sight to the right front of the vehicle and the left front of the vehicle in turn. In a case where multiple icons representing multiple risk factors are presented at the same time, high and low degrees of risk may be presented in a distinguishable manner. For example, an icon representing a risk factor at a relatively high degree of risk may be presented in red and an icon representing a risk factor at a relatively low degree of risk may be presented in yellow.

What is claimed is:

1. A driving assistance device for use in a subject vehicle, the driving assistance device comprising:
    a risk degree obtaining portion obtaining a degree of a risk of an event threatening a safety of a driver of the subject vehicle when an occurrence of the event is predicted;
    a risk handling control portion controlling an execution of a risk handling measure by a risk handling unit against the event that is predicted;
    a risk factor obtaining portion obtaining a factor which causes the risk as a risk factor; and
    a presentation control portion controlling a presentation of information about the risk factor, wherein
    the degree of the risk of the event threatening the safety of the driver is obtained by
        converting observation information from one or more vehicle sensors or communication devices into a logical formula,
        assigning a cost value to the logical formula,
        generating a proof candidate group of a plurality of proof candidates by using backwards inference on the logical formula with the assigned cost value and other logical formulae stored in a database,
        calculating a proof cost for each of the plurality of proof candidates in the proof candidate group,
        selecting a lowest proof cost proof candidate from among the plurality of proof candidates,
        identifying a predicted risk from information associated with the lowest proof cost proof candidate, the logical formula with the assigned cost value, and information correlated to the other logical formulae in the database, and
        calculating the degree of the risk of the event threatening the safety of the driver using a reciprocal value of the lowest proof cost proof candidate used to identify the predicted risk,
    the presentation control portion is configured to present, as information indicating a presence of the risk factor, (i) an icon representing the subject vehicle, (ii) an icon representing the risk factor, and (iii) an icon representing a direction in which the risk factor is present,
    the information indicating the presence of the risk factor includes the icon representing the subject vehicle using a bird's eye view image captured from a viewpoint positioned rear and above the subject vehicle;
    the information indicating the presence of the risk factor includes a predetermined region that displays (i) the icon representing the risk factor on a front and lateral side of the icon representing the subject vehicle and (ii) the icon representing the direction in which the risk factor is present from a viewpoint of the subject vehicle,
    when the risk handling control portion controls the risk handling unit not to execute the risk handling measure and the degree of the risk is equal to or higher than a predetermined value, the presentation control portion presents, as the information indicating the presence of the risk factor, (i) the icon representing the subject vehicle, (ii) the icon representing the risk factor, and (iii) the icon representing the direction in which the risk factor is present between the icon representing the subject vehicle and the icon representing the risk factor, and
    the presentation control portion presents, as information indicating an absence of the risk factor, only the icon representing the subject vehicle without presenting the icon representing the risk factor and the icon representing the direction in which the risk factor is present viewed from the subject vehicle when the risk handling control portion controls the risk handling unit not to execute the risk handling measure and the degree of the risk is lower than the predetermined value.

2. A driving assistance device for use in a subject vehicle, the driving assistance device comprising:
    a risk handling control portion controlling an execution of a risk handling measure by a risk handling unit when an occurrence of an event threatening a safety of a driver of the subject vehicle is predicted;
    a risk factor obtaining portion obtaining a factor which causes the risk as a risk factor; and
    a presentation control portion controlling a presentation of information about the risk factor, wherein
    a degree of the risk of the event threatening the safety of the driver is obtained by
        converting observation information from one or more vehicle sensors or communication devices into a logical formula,
        assigning a cost value to the logical formula,
        generating a proof candidate group of a plurality of proof candidates by using backwards inference on the logical formula with the assigned cost value and other logical formulae stored in a database,
        calculating a proof cost for each of the plurality of proof candidates in the proof candidate group,
        selecting a lowest proof cost proof candidate from among the plurality of proof candidates,
        identifying a predicted risk from information associated with the lowest proof cost proof candidate, the logical formula with the assigned cost value, and information correlated to the other logical formulae in the database, and
        calculating the degree of the risk of the event threatening the safety of the driver using a reciprocal value of the lowest proof cost proof candidate used to identify the predicted risk,
    the presentation control portion is configured to present, as information indicating a presence of the risk factor, (i) an icon representing the subject vehicle, (ii) an icon representing the risk factor, and (iii) an icon representing a direction in which the risk factor is present,
    the information indicating the presence of the risk factor includes the icon representing the subject vehicle using a bird's eye view image captured from a viewpoint positioned rear and above the subject vehicle;
    the information indicating the presence of the risk factor includes a predetermined region that displays (i) the icon representing the risk factor on a front and lateral side of the icon representing the subject vehicle and (ii) the icon representing the direction in which the risk factor is present from a viewpoint of the subject vehicle, when the risk handling control portion controls the risk handling unit not to execute the risk handling measure and the risk factor is determined to be existing, the presentation control portion presents, as the information indicating the presence of the risk factor, (i) the icon representing the subject vehicle, (ii) the icon representing the risk factor, and (iii) the icon representing the direction in which the risk factor is present between the icon representing the subject vehicle and the icon representing the risk factor, and the presentation control portion presents, as information indicating an absence of the risk factor, only the icon representing the subject vehicle without presenting the icon representing the risk factor and the icon representing the direction in which the risk factor is present viewed from the subject vehicle when the risk handling control portion controls the risk handling unit not to execute the risk handling measure and the degree of the risk is lower than a predetermined value.

3. A driving assistance program product stored in a non-transitory storage medium and to be executed by a control unit of a driving assistance device, wherein the driving assistance device includes a risk handling unit that executes a risk handling measure against an event threatening a safety of a driver when an occurrence of the event is predicted, the driving assistance program product comprising instructions for implementing:

obtaining a degree of a risk of the event threatening the safety of the driver when the occurrence of the event is predicted;

obtaining a factor which causes the risk as a risk factor;

obtaining the degree of the risk of the event threatening the safety of the driver by converting observation information from one or more vehicle sensors or communication devices into a logical formula, assigning a cost value to the logical formula, generating a proof candidate group of a plurality of proof candidates by using backwards inference on the logical formula with the assigned cost value and other logical formulae stored in a database, calculating a proof cost for each of the plurality of proof candidates in the proof candidate group, selecting a lowest proof cost proof candidate from among the plurality of proof candidates, identifying a predicted risk from information associated with the lowest proof cost proof candidate, the logical formula with the assigned cost value, and information correlated to the other logical formulae in the database, and calculating the degree of the risk of the event threatening the safety of the driver using a reciprocal value of the lowest proof cost proof candidate used to identify the predicted risk, in response to determining that the risk handling measure against the event that is predicted is not executed and the degree of the risk is equal to or higher than a predetermined value, presenting, as information indicating a presence of the risk factor, (i) an icon representing a subject vehicle using a bird's eye view image captured from a viewpoint positioned rear and above the subject vehicle, (ii) an icon representing the risk factor on a front and lateral side of the icon representing the subject vehicle, and (iii) an icon representing a direction in which the risk factor is present from a viewpoint of the subject vehicle between the icon representing the subject vehicle and the icon representing the risk factor, and a presentation control portion presents, as information indicating an absence of the risk factor, only the icon representing the subject vehicle without presenting the icon representing the risk factor and the icon representing the direction in which the risk factor is present viewed from the subject vehicle when a risk handling control portion controls the risk handling unit not to execute the risk handling measure and the degree of the risk is lower than the predetermined value.

4. A driving assistance program product stored in a non-transitory storage medium and to be executed by a control unit of a driving assistance device, wherein the driving assistance device includes a risk handling unit that executes a risk handling measure against an event threatening a safety of a driver when an occurrence of the event is predicted, the driving assistance program product comprising instructions for implementing:

obtaining a factor which causes the risk as a risk factor;

obtaining a degree of the risk of the event threatening the safety of the driver by converting observation information from one or more vehicle sensors or communication devices into a logical formula, assigning a cost value to the logical formula, generating a proof candidate group of a plurality of proof candidates by using backwards inference on the logical formula with the assigned cost value and other logical formulae stored in a database, calculating a proof cost for each of the plurality of proof candidates in the proof candidate group, selecting a lowest proof cost proof candidate from among the plurality of proof candidates, identifying a predicted risk from information associated with the lowest proof cost proof candidate, the logical formula with the assigned cost value, and information correlated to the other logical formulae in the database, and calculating the degree of the risk of the event threatening the safety of the driver using a reciprocal value of the lowest proof cost proof candidate used to identify the predicted risk, in response to determining that the risk handling measure against the event that is predicted is not executed and the risk factor exists, presenting, as information indicating a presence of the risk factor, (i) an icon representing a subject vehicle using a bird's eye view image captured from a viewpoint positioned rear and above the subject vehicle, (ii) an icon representing the risk factor on a front and lateral side of the icon representing the subject vehicle, and (iii) an icon representing a direction in which the risk factor is present from a viewpoint of the subject vehicle between the icon representing the subject vehicle and the icon representing the risk factor, and a presentation control portion presents, as information indicating an absence of the risk factor, only the icon representing the subject vehicle without presenting the icon representing the risk factor and the icon representing the direction in which the risk factor is present viewed from the subject vehicle when a risk handling control portion controls the risk handling unit not to execute the risk handling measure and the degree of the risk is lower than a predetermined value.

* * * * *